Patented Feb. 17, 1942

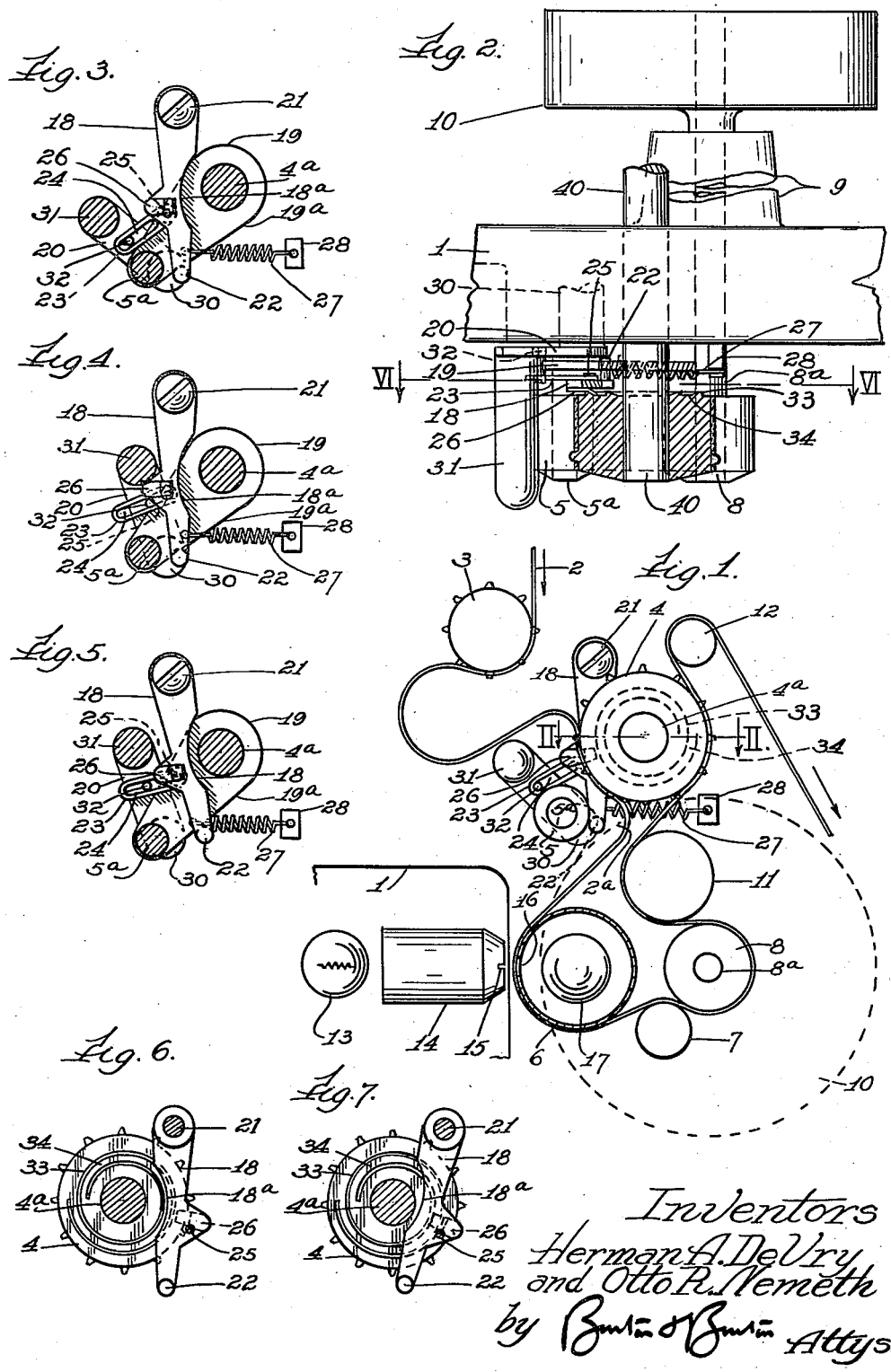

2,273,024

UNITED STATES PATENT OFFICE 2,273,024

SOUND RECORDING AND REPRODUCING APPARATUS

Herman A. DeVry and Otto R. Nemeth, Chicago, Ill., assignors to DeVry Corporation, Chicago, Ill., a corporation of Illinois Application June 24, 1940, Serial No. 342,142

8 Claims. (Cl. 271—2.3)

The present invention relates to improvements in sound recording and reproducing apparatus with a resilient film path, and, more particularly, to improved cinematographic apparatus for translating sound vibrations to or from a film record by the use of light varied in accordance with the sound, having means for supporting, feeding and resiliently guiding the film in frictional engagement with a cylinder cooperating with a fly wheel.

The primary object of this invention is to provide in apparatus of the kind described a device for reducing the tension exerted on the film, when starting the movement of the projector, such device preventing full frictional engagement of the film with the fly wheel so that the inertia of the fly wheel shall not subject the film to dangerous tensile strain or rupture.

Another object of this invention is to provide in apparatus of the kind described a device reducing the said tension in such a manner that the effective driving connection between the film and the fly wheel shall be delayed during the starting of the projector.

Another object of this invention is to provide in apparatus of the kind described such a film tension reducing device, especially one with a retarding effect, at a take-up sprocket cooperating with the fly wheel.

Another object of this invention is to provide the device in such a manner as to enable the operator to easily thread the film band.

Other objects and advantages of this invention will appear to those skilled in the art from the following specification with appended claims, one embodiment of the invention having been illustrated, by way of example, in the accompanying drawing.

In this drawing—

Fig. 1 is a somewhat diagrammatic partial side elevation of the sound reproducing portion of a motion picture projector, Figure 2 is a fragmentary plan view of the parts shown in Figure 1 with portions taken in section as indicated at line II—II on Figure 1.

Figures 3, 4 and 5 are detail sectional views showing the adjustable idlers at different positions of adjustment.

Figures 6 and 7 are detail sectional views taken substantially as indicated at line VI—VI on Figure 2 showing respectively two different positions of the control means for delaying the effective drive of the fly wheel.

In the drawing (Figs. 1, 2): 1 designates the support plate for the sound reproducing contrivance, 2 the film, the feeding direction of which is indicated by arrows, this film already having passed the optical means (not shown) and having progressed to the sprocket 3 securing the intermittent film movement. From this point the film 2 is fed around the take-up sprocket 4 which secures the sound loop formation, continuing to pass along a resilient idler 5, the sound drum 6, another idler 7 and the sound filter roller or cylinder 8 cooperating with the co-axial fly wheel 10 on a shaft 8ª supported in a suitable bearing 9. The film 2 is finally fed, under control of two opposite idlers 11, 12, along the take-up sprocket 4 for returning to the take-up wheel. There are also shown an exciter lamp 13, a lens barrel 14 with sound slit 15, a sound slit window 16 and a photo-electric cell 17.

As to the aforementioned resilient idler 5, the axle of which is designated by 5ª, it is known to provide even two idlers in a resilient manner and adjacent the cylinder 8 to avoid film strains caused by the action of the fly wheel 10, but such an arrangement involves the disadvantage of causing initially excessive stresses and even rupture of the film strip. The aim of the present invention being a tension reducing device, especially a device with retarded effect, the said idler or roller 5 has been chosen as a resilient one primarily to facilitate threading the film, the idler functioning with the take-up sprocket 4 to provide the sound loop formation.

In the embodiment of the invention illustrated in Figures 1 to 7 there are shown three levers 18, 19 and 20 cooperating with the take-up sprocket 4. The lever 18 is shaped at 18ª to clear the axle 4ª of the sprocket 4 and is provided with a fixed fulcrum at one end, as shown at 21. On the free end of the lever a bolt or pin 22 extends transversely in engagement with the edge 19ª of the lever 19. An ear or link 23, having a longitudinal slot 24, is hinged to the lever 18 at 25, and the lever also carries a flat spring rider or follower 26 at a point intermediate its ends and on the opposite face of the lever from the slotted link 23. The lever 19 is fulcrumed on the axle 4ª of the sprocket 4, and is yieldingly held in position by a spring 27 having one end connected to the lever 19 and the other end attached to an anchorage on a block 28 which may be understood as fixedly mounted on any convenient portion of the supporting frame or plate 1. Since the pin 22 on the lever 18 engages the edge 19ª of the lever 19 it will be seen that when the lever 18 is swung away from the axle 4ª the lever 19 will be correspondingly displaced in opposition to the tension of the spring 27. The third lever 20, which is fulcrumed at 30, is provided at its free end with a handle 31 which also serves as a guide or idler for the film, and which may be employed to displace the whole assembly 18, 19, 20 in the process of threading the film. For easier comprehension, in Figures 3, 4 and 5 the sprocket 4 is omitted and its axle 4ᵃ, as well as the handle 31 and the axle 5ᵃ of the idler 5 are shown in section as though cut off close to the plane of the levers. The lever 20 carries a pin 32 engaging in the slot 24 of the link 23. A spiral cam 33 is formed on the inner face 34 of the sprocket 4, and, as shown, the cam comprises two complete turns so that its inner and outer ends are spaced apart radially on the face of the wheel 4, as seen in dotted outline in Figure 1 and in full lines in Figures 6 and 7. The spiral 33 may be in the form of a groove or in the form of a projection on the face of the wheel 4, but, as shown, it may be understood as a projection or bead with which the rider or follower 26 on the lever 18 engages.

The operation of the invention is as follows:

By swinging the handle 31 toward the left (as seen in Figure 3) away from the take-up sprocket 4 to a limiting position which may be determined by a stop, not shown, the assembly 18, 19, 20 will be shifted in opposition to the spring 27 and to a position to facilitate threading of the film 2. When this has been accomplished the handle 31 will be moved back to the position shown in Figure 4, at which the handle 31 will serve as one guide or idler for the film 2, and it may be understood that, if desired, the handle may be formed as a roller to fulfill this function more effectively. In the outward swing of the handle 31 to the position shown in Figure 3 the lever 18 is swung outward to a position at which its spring follower 26 is dragged across the upstanding spiral bead or cam 33 and the lever 18 engaging the lever 19 by means of its transversely extending pin 22 will hold the lever 19 in a position at which the idler 5, carried thereby, is swung away from the sprocket 4. However, by virtue of the slot 24 in link 23 the handle 31 can be swung back toward the sprocket 4 to the position shown in Figure 4.

As the mechanism is started, and the film commences to feed over sprockets 3 and 4, the idler 5 will not be in position to take up all the slack, and thus the film will be permitted to slip, to some extent, on the cylinder 8 through which the fly wheel is driven. But the spring 27, exerting a tension upon the lever 19, and, through it, upon the lever 18, will force the follower 26 against the spiral cam 33 so that as the sprocket 4 rotates, the follower will travel radially across the face of the sprocket, moving the lever 19 and the idler 5 gradually closer to the sprocket 4. In this way the slack in the film is taken up so as to increase its tension and its frictional engagement with the drum or cylinder 8 for driving the fly wheel 10.

During this movement of the levers 18 and 19 more or less independently of the lever 20 the pivotal or hinged connection of the slotted link 23 to the lever 18 permits the link to accommodate itself to this movement. And, notwithstanding the definitely timed movement of the lever 18 and its follower 26 in response to rotation of the spiral cam 33, the idler roller 5 still engages the film resiliently, since its position is maintained by the yielding tension of the spring 27 acting on the lever 19. The shifting of the parts to facilitate threading the film is accomplished by hand by means of the handle 31 and rapidly without any particular timing, since it involves merely dragging the yielding spring follower 26 radially across the spiral cam element 33; but the opposite displacements of the parts under tension of the spring 27 are definitely timed by the rotation of the sprocket 4 and the cam 33 thereon so as to automatically delay the fully effective action of the idler roller 5, causing it to engage the portion of the film at 2ᵃ to produce a slowly increasing tension in the film strip and a gradually increasing frictional engagement between the film and the fly wheel 10.

This invention is not to be understood as restricted to the embodiment or to the details of construction herein set forth since especially these details may be variously modified without departure from the spirit of the invention, and within the scope of the appended claims.

We claim:

1. In combination with a film feeding mechanism, a movably mounted film tensioning idler roller, means urging said roller toward its maximum-tension position and stop means acting to hold said roller initially away from said position, together with means actuated by the feeding movement of the film feeding mechanism and operable to release the roller from control of said stop means.

2. In combination with a film feeding mechanism, a movably mounted film tensioning idler roller, means for shifting said roller away from its tensioning position to permit the film to be threaded, yielding means urging said roller toward its maximum-tension position, and means opposing said yielding means and delaying the return of said roller to maximum-tension position until after the film feeding movement of the mechanism has proceeded to a predetermined extent.

3. In combination with a film feeding mechanism, a movably mounted film tensioning idler roller, spring means urging said roller toward its maximum-tension position and a spiral cam acting as a stop opposing said spring means and holding said roller initially away from said position, said cam being rotatable by the initial film feeding movement of the mechanism in the direction to withdraw its opposition and permit the roller to be moved to its maximum-tension position.

4. In combination with a film feeding mechanism, a fly wheel, a driving pulley for the fly wheel operable by frictional engagement with the film, a movably mounted idler roller engageable with the film at a position to tension it against said pulley, spring means urging said roller toward its maximum-tension position, and stop means acting to hold said roller initially away from said position, together with means actuated by the feeding movement of the film feeding mechanism and operable to release the roller from the control of said stop means.

5. In combination with a film feeding mechanism, a fly wheel, a driving pulley for the fly wheel operable by frictional engagement with the film, a movably mounted idler roller engageable with the film at a position to tension it against said pulley, spring means urging said roller toward its maximum-tension position, and means opposing said spring means and delaying the return of said roller to maximum-tension position until after the film feeding movement of the mechanism has proceeded to a predetermined extent.

6. In combination with a film feeding mechanism which includes a film driving sprocket wheel, a movably mounted film tensioning idler roller, spring means urging said roller toward its maximum-tension position and a spiral cam on said sprocket wheel acting as a stop opposing said spring means and holding said roller initially away from its maximum-tension position, the rotation of the sprocket in film feeding direction operating to rotate the cam in the direction to withdraw its opposition and permit the roller to be moved to maximum-tension position after the film has traveled to a predetermined extent.

7. In combination with a film feeding mechanism which includes a film driving sprocket wheel, a pair of idler rollers movably mounted for cooperating with said sprocket to hold the film in driving engagement therewith, said idlers being adjustable away from the sprocket wheel to permit threading of the film, spring means tending to return one of said idlers to efficient film tensioning position and stop means automatically opposing such return, together with means actuated by the film feeding movement of the mechanism and operable to release the roller from the control of said stop means after the film has traveled to a predetermined extent.

8. In combination with a film feeding mechanism, a fly wheel, a driving pulley for the fly wheel operable by frictional engagement with the film, a film driving sprocket wheel, a pair of idler rollers movably mounted for cooperating with said sprocket to hold the film in driving engagement therewith, said idlers being adjustable away from the sprocket wheel to permit threading of the film, spring means tending to return one of said idlers to efficient film tensioning position and stop means automatically opposing such return, together with means actuated by the film feeding movement of the mechanism and operable to withdraw the opposition of said stop means gradually for preventing full frictional engagement of the film with said pulley during the initial portion of its movement.

HERMAN A. DeVRY.
OTTO R. NEMETH.